Feb. 7, 1933. E. B. JONES 1,896,314

SIGNAL

Filed May 27, 1932

Inventor
E. B. Jones
By C. A. Snow & Co.
Attorneys.

Patented Feb. 7, 1933

1,896,314

UNITED STATES PATENT OFFICE

EDWIN B. JONES, OF ELMIRA, NEW YORK

SIGNAL

Application filed May 27, 1932. Serial No. 614,020.

This invention aims to provide a signal adapted to be mounted on an auto for the purpose of enabling the driver of the auto to convey his intentions relative to proceeding straight ahead, making a right hand turn, or making a left hand turn, it being possible for the driver to have both hands free, for the control of the car, after the signal has been set, the construction being such that the signal may be used on a closed car, with the slidable panel of the car door either open or closed.

Another object of the invention is to provide a device of the class described which can be made cheaply out of sheet metal, and still have the requisite strength.

A further object of the invention is to provide novel means for operating the signal arms.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
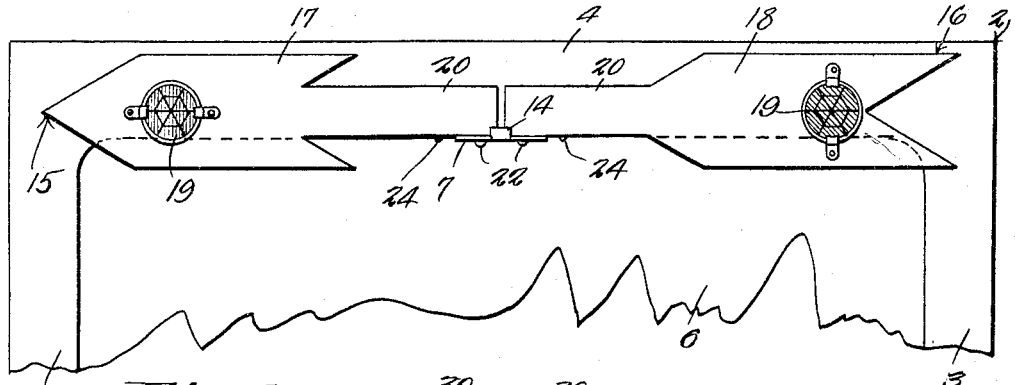
Fig. 1 shows in elevation, a portion of a door of an automobile, whereon the device forming the subject matter of this application is mounted.

The numeral 1 marks a portion of the body of an auto, carrying the usual hinged door 2. The stiles of the door 2 are marked by the numeral 3, and the numeral 4 designates the top rail of the door. There are grooves 5 in the inner edges of the stiles 3, and in these grooves, a glass panel 6 is mounted for vertical sliding movement. The foregoing describes an ordinary automobile construction, for which no novelty is claimed, saving in so far as the parts specified may co-operate with parts hereinafter described.

The device forming the subject matter of this application preferably is made of sheet metal throughout. It includes a bracket plate 7 having a hole 8. The bracket plate 7 is extended crosswise of the lower edge of the top rail 4 of the door 2, and is connected to the rail 4 by a screw 9, or other securing element, mounted in the hole 8 of the bracket plate. On the inner end of the bracket plate 7 there is an upstanding, rectangularly disposed flange 10, which is secured to the inner side of the top rail 4 of the door 2 by one or more screws 11 or other securing elements. The bracket plate 7 extends outwardly with respect to the door 2, and in the outer end of the bracket plate there is a notch 12. The material set free in the formation of the notch 12 is turned upwardly, to form a stop 14, arranged at right angles to the bracket plate 7.

Figure 3:
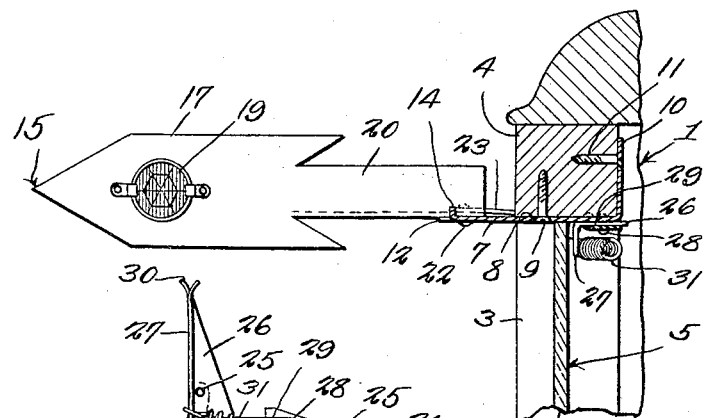
Fig. 3 is a vertical section, wherein parts remain in elevation, the view showing the device in place on the car door.

Signal arms 15 and 16 are provided. These signal arms 15 and 16 may be of any desired shape. It is suggested that they be so made that, when taken together, as shown in Fig. 1, they will assume the general shape of an arrow, the broadened end 17 of the arm 15 being the head of the arrow, and the broadened end 18 of the arm 16 being the notched tail of the arrow. The end portions 17 and 18 of the signal arms 15 and 16 are provided on their opposite sides with signaling devices 19, of any desired construction. It is suggested that these signaling devices may be colored glass buttons, adapted to be illuminated by the lamps of approaching vehicles. The signal arm 15, shown in outstanding position in Fig. 3, is used to indicate a left turn, and it is suggested that the button 19 of the signal arm 15 be red. When the signal arm 16 is turned out at right angles to the car, to assume the position occupied by the signal arm 15 of Fig. 3, that means that a right hand turn is to be made. The signaling device 19 of the arm 16 may be green. The colors of the signaling devices, however, may be left to the manufacturer.

The signal arms 15 and 16 have reduced shanks 20, provided with inwardly extended, rectangularly disposed flanges 21, which are as long as the shanks 20. The flanges 21 reenforce the shanks 20, and they form a means whereby the signal arms 15 and 16 may be conveniently pivoted upon the outer end of the bracket plate 7. Pivot elements 22 connect the flanges 21 of the signal arms with the outer end of the bracket plate 7, the construction being such that the signal arms can swing horizontally, from a position parallel to the door 2, as shown in Fig. 1, to a position at right angles to the door, as shown in Fig. 3. When either of the signal arms 15 or 16 is swung outwardly to a position at right angles to the door, the signal arm comes into contact with the stop 14 on the outer end of the bracket plate 7, the function of the stop, therefore, being obvious. The stop 14, however, has another function, in that it is wide enough so that if the operator happens to swing both of the signal arms 15 and 16 outwardly, at once, into a position at right angles to the car, as in Fig. 3, the signaling devices 19 of the arms 15 and 16 will not knock together and become broken or nicked, the signaling devices 19 being generally made of glass.

Figure 2:
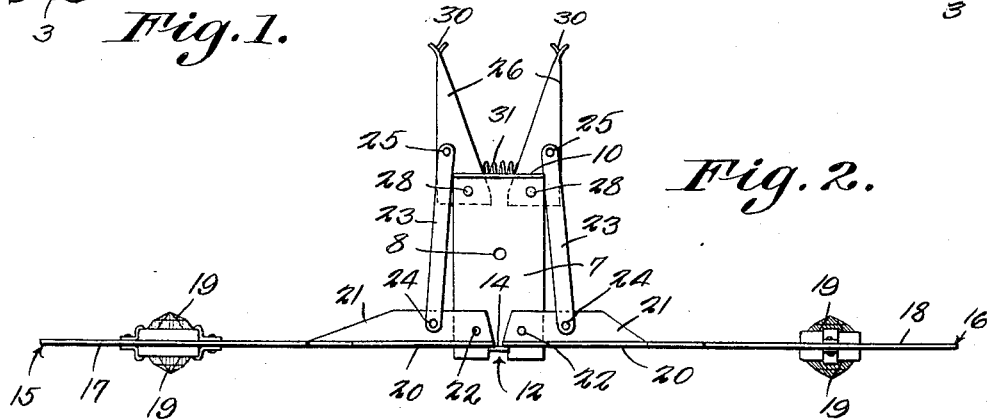
Fig. 2 is a top plan of the device, detached from the door.

The means for swinging the signal arms 15 and 16 inwardly and outwardly may be of any desired construction. Thus, the outer ends of links 23 may be pivoted at 24 to the flanges 21 of the signal arms, as shown in Fig. 2. The inner ends of the links 23 are pivoted at 25 to levers 26, which may be of triangular form, for the sake of strength, since the levers, like the other parts of the device, are made of sheet metal. For the further reenforcement and strengthening of the levers 26, they are provided upon their outer edges, with downwardly extended, rectangularly disposed flanges 27. The fulcra for the levers 26 may be rivets 28 or the like, mounted in the inner end of the bracket plate 7. The rivets 28 hold in place, on the bracket plate 7, a yoke strip 29, shown best in Fig. 4. The levers 26 swing, on their fulcra 28, between the yoke strip 29 and the inner end of the bracket plate 7, as Fig. 3 will show, the yoke strip being located below the bracket plate 7. The yoke strip 29 aids in forming a secure and substantial mounting for the levers 26. The outer ends of the flanges 27 of the levers 26 are slit inwardly a little way, and the material is bent outwardly in opposite directions, to form finger pieces 30, facilitating the manipulation of the levers 26.

The numeral 31 indicates a pull spring, having its ends connected to the flanges 27 of the levers 26.

Figure 4:
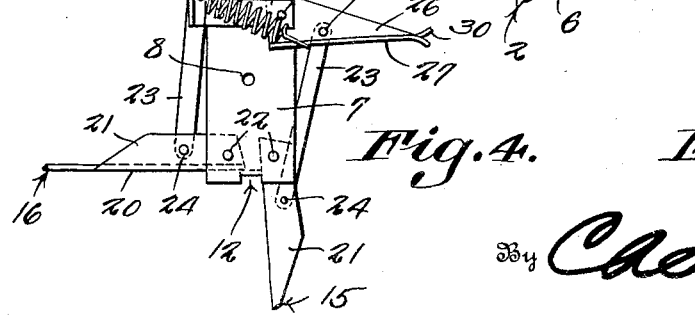
Fig. 4 is a bottom plan of the article, detached from the door.

The operator can swing either of the levers 26, and the corresponding link 23 will swing the corresponding signal arm 15 or 16 outwardly, to a position at right angles to the car, as shown in Fig. 3, the signal arm 15 designating a left turn, and the signal arm 16 designating a right turn. The spring 31 is so located with respect to the fulcra 28 of the levers 26, that when either of the arms 15 and 16 is parallel to the car, as shown in connection with the arm 16 in Fig. 4, the end of the spring that is connected to the lever 26 that operates that particular arm, will be behind the fulcrum 28 of that lever, as shown at the left hand side of Fig. 4. The tendency of the spring 31 then is to hold the arm, specifically the arm 16 of Fig. 4, in parallel relation to the car. When, however, either signal arm, for instance the signal arm 15 of Fig. 4, is swung outwardly to a position substantially at right angles to the car, then the point of connection between the spring 31 and the lever 26 which operates the signal 15, will be outwardly or in front of the fulcrum 28 of the lever, as shown at the right hand side of Fig. 4, and the tendency of the spring 31 then will be to hold the signal arm in the outstanding position disclosed at the right hand side of Fig. 4.

The signal arms 15 and 16 can be operated regardless of whether the panel 6 in the door 2 is open or closed. The parts of the signaling device are made of sheet metal, and are thin enough so that when the panel 6 is shoved up against the bottom of the bracket plate 7, the space between the upper edge of the panel 6 and the lower edge of the top rail 4 will not amount to anything, so far as letting in rain or wind is concerned. The device, therefore, although capable of being operated from inside of the car, does not prevent a substantial closing of the car, and it is unnecessary to make slots or openings in the frame work of the car, for the accommodation of the signaling mechanism. It may be noted, referring particularly to Fig. 3, that in mounting the bracket plate 7 on the door of the car, there are no fastening devices which are visible from the outside of the car, and the appearance of the car is not rendered objectionable by nails or screws showing on the outside of the car.

Having thus described the invention, what is claimed is:

1. The combination with a vehicle including a frame embodying a cross bar and a panel slidable in the frame toward and away from the cross bar, of a thin sheet-metal plate secured in contact with the inner edge of the cross bar, a signal external to the vehicle and movably mounted on the plate, and operating means located at the sides of the plate and connected to the signal and extended within the vehicle, across the inner edge of the cross bar, the plate and the operating means being of substantially the same thickness, and being in the same plane where they pass across the upper edge of the panel, and being thin enough so that the panel can be moved to a practically closed position with respect to the cross bar.

2. A signal for autos, comprising a bracket, signal arms pivoted at their inner ends to the outer end of the bracket, levers fulcrumed at their inner ends on the inner end of the bracket and having their outer ends projecting beyond the bracket, the outer ends of the levers being free, to form handles, links pivoted to the signal arms, intermediate the ends of the signal arms, and means for pivoting the links to the levers at points between the fulcrumed and handle ends of the levers.

3. A signal for autos, comprising a bracket, independently-movable signal arms pivoted at their adjacent ends to the outer end of the bracket, one signal arm being constructed to represent the head of an arrow, and the other signal arm being constructed to represent the tail of an arrow, and means mounted on the inner portion of the bracket for manipulating the signal arms.

4. In a signal for autos, a bracket having a single stop at its outer end, signal arms pivoted to the bracket on opposite sides of the stop and outwardly thereof, and adapted to engage at their inner edges with the stop, to dispose the arms in outstanding relation to the bracket, and means mounted on the inner end of the bracket for operating the signal arms one at a time.

5. A signal for autos, comprising a bracket, a single stop on the outer end of the bracket, signal arms, pivot elements connecting the signal arms to the outer end of the bracket on opposite sides of the stop, signaling devices on the signal arms and projecting laterally therefrom, and means assembled with the signal arms and with the inner portion of the bracket, for operating the arms, the inner edges of the arms being engageable with the stop to hold the arms in outstanding relation with respect to the bracket, the pivot elements being so located, and the stop being of such width as to prevent the signaling devices on the arms from knocking together, if both arms happen to be swung outwardly at once.

In testimony that I claim the foregoing as my own, I have hereto affixed my signature.

EDWIN B. JONES.